US010974821B2

(12) United States Patent
Nguyen et al.

(10) Patent No.: US 10,974,821 B2
(45) Date of Patent: Apr. 13, 2021

(54) AIRCRAFT UNDERCARRIAGE FITTED WITH A SHIMMY-ATTENUATOR DEVICE

(71) Applicant: SAFRAN LANDING SYSTEMS, Velizy Villacoublay (FR)

(72) Inventors: Nicolas Nguyen, Velizy Villacoublay (FR); Laurent Mallet, Toulon (FR); Frédéric Ivaldi, Toulon (FR); Thierry Blanpain, Velizy Villacoublay (FR); Philippe Henrion, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 641 days.

(21) Appl. No.: 15/676,261

(22) Filed: Aug. 14, 2017

(65) Prior Publication Data
US 2018/0086440 A1    Mar. 29, 2018

(30) Foreign Application Priority Data

Sep. 29, 2016  (FR) ...................... 16 59340

(51) Int. Cl.
*B64C 25/50*  (2006.01)
(52) U.S. Cl.
CPC ................. *B64C 25/505* (2013.01)
(58) Field of Classification Search
CPC ....... B65C 25/505; B65C 25/58; B65C 25/62; B60B 33/045; E05F 3/20; E05F 5/00;
(Continued)

(56) References Cited

U.S. PATENT DOCUMENTS

| 2,367,993 | A | * | 1/1945 | Bishop | ................. B64C 25/505 |
|           |   |   |        |        | 16/35 D |
| 2,393,110 | A | * | 1/1946 | Kops | ..................... B64C 25/505 |
|           |   |   |        |        | 244/100 R |

(Continued)

FOREIGN PATENT DOCUMENTS

| CA | 2 511 067 A1 | 12/2005 |
| EP | 3 048 046 A1 | 7/2016 |
| GB | 2 263 087 A | 7/1993 |

OTHER PUBLICATIONS

French Preliminary Search Report for 1659340, dated May 23, 2017.
French Written Opinion for 1659340 dated May 23, 2017.

*Primary Examiner* — Medhat Badawi
*Assistant Examiner* — Vicente Rodriguez
(74) *Attorney, Agent, or Firm* — Sughrue Mion, PLLC

(57) ABSTRACT

An aircraft undercarriage having a sliding rod slidably mounted in a strut-leg, and a scissors linkage (4) having one branch (4a) hinged to the strut-leg or to a turning element of a control for steering the sliding rod mounted to turn in the strut-leg, and one branch (4b) hinged to the sliding rod, the branches being hinged to each other by a pivot pin (12), the undercarriage being fitted with a shimmy-attenuator device (10a, 10b) placed on the pivot pin of the shimmy-attenuator, the attenuator device including threshold resilient return means generating a force returning the branches towards a rest position, and at least damping means generating a damping force when the branches move axially along the pivot pin. The attenuator device comprises two modules (10a, 10b) placed on either side of the scissors linkage in order to co-operate with the pivot pin, each of the modules performing at least one of the damping function and the threshold resilient return function.

6 Claims, 3 Drawing Sheets

(58) Field of Classification Search
CPC ....... B60N 2/508; B64C 25/505; B64C 25/58; B64C 25/62; B64C 25/50
See application file for complete search history.

(56) References Cited

U.S. PATENT DOCUMENTS

| | | | | |
|---|---|---|---|---|
| 2,849,199 | A | * | 8/1958 | Lucien .................. B64C 25/505 244/104 R |
| 3,499,621 | A | | 3/1970 | Boehringer et al. |
| RE27,450 | E | * | 8/1972 | boehringer .............. B64C 25/32 244/103 R |
| 5,224,668 | A | * | 7/1993 | Boehringer ............... F16F 9/19 188/266 |
| 9,499,261 | B2 | * | 11/2016 | Narayan ................. B64C 25/34 |

* cited by examiner

AIRCRAFT UNDERCARRIAGE FITTED WITH A SHIMMY-ATTENUATOR DEVICE

BACKGROUND OF THE INVENTION

Shimmy is a vibratory phenomenon that affects certain undercarriages, and involves coupling between bending oscillations and twisting oscillations of the undercarriage. Undercarriages are known, in particular main undercarriages that do not include any steering control, that are fitted with a shimmy-attenuator device placed on the pin at the apex of the scissors linkage connecting the sliding rod to the strut-leg of the undercarriage. The attenuator device is interposed between the outer side face of one of the branches of the scissors linkage and one end of the pivot pin hinging the branches of the linkage to each other, with the other end of the pivot pin bearing against the outer face of the other branch of the linkage. During twisting oscillation, the branches of the scissors linkage tend to seek to move relative to each other along the pivot pin. The attenuator device is fitted with a threshold resilient member such that when the twisting torque exceeds a determined threshold, the device allows the branches of the scissors linkage to move against a resilient force. The attenuator device is also fitted with a damper member so as to generate a damping force during such movement apart. The attenuator devices are cantilevered out on the side of the scissors linkage, thus forming an unbalance, which can lead to premature wear of the pin at the apex of the scissors linkage.

Those attenuator devices are conventionally installed on undercarriages that do not have any angular steering control for the sliding rod, since the twisting oscillations in such undercarriages are naturally damped by the constrictions in the hydraulic unit for controlling steering. Nevertheless, the recent development of electromechanical steering controls, has lead to undercarriages that are fitted therewith having a high level of stiffness in twisting, which in certain configurations can justify installing an attenuator device on the scissors linkage having its top branch hinged not to the strut-leg itself but to an element that is mounted to turn about the strut-leg and that has its angular position adjusted by the steering control, such as a tube rotatably mounted inside the strut-leg and about the sliding rod, and capable, where appropriate, of carrying the sliding bearing for the sliding rod, or else a collar that is mounted to turn about the strut-leg.

OBJECT OF THE INVENTION

An object of the invention is to propose an undercarriage provided with a shimmy-attenuator device for placing at the apex of the scissors linkage so as to reduce impacts on the pivot pin of the scissors linkage.

SUMMARY OF THE INVENTION

In order to achieve this object, there is provided an aircraft undercarriage having a sliding rod slidably mounted in a strut-leg, and a scissors linkage having one branch hinged to the strut-leg or to a turning element of a control for steering the sliding rod mounted to turn in the strut-leg, and one branch hinged to the sliding rod, the branches being hinged to each other by a pivot pin, the undercarriage being fitted with a shimmy-attenuator device placed on the pivot pin of the scissors linkage, the attenuator device including at least one threshold resilient return member generating a force returning the branches towards a rest position, and at least one damping member generating a damping force when the branches move axially along the pivot pin. According to the invention, the attenuator device comprises two modules placed on either side of the scissors linkage in order to co-operate with the pivot pin, each of the modules performing at least one of the damping function and the threshold resilient return function.

Thus, the attenuator device is split into two modules that are placed on either side of the scissors linkage, so that the lateral unbalance effect is very greatly attenuated, thereby significantly reducing fatigue stress on the pivot pin.

In a first particular embodiment of the invention, the attenuator device has a single return member carried one of the modules and a single damper member carried by the other module.

The modules are thus specialized and can therefore be designed and fabricated by respective return and damping specialists.

In a second particular embodiment of the invention, each of the modules has both a return member and a damper member.

It is thus possible to propose modules that are identical and interchangeable, thereby facilitating the management of their maintenance and their replacement.

BRIEF DESCRIPTION OF THE DRAWINGS

The invention can be better understood in the light of the following description of particular embodiments of the invention, given with reference to the figures of the accompanying drawings, in which.

DETAILED DESCRIPTION OF THE INVENTION

Figure 1:
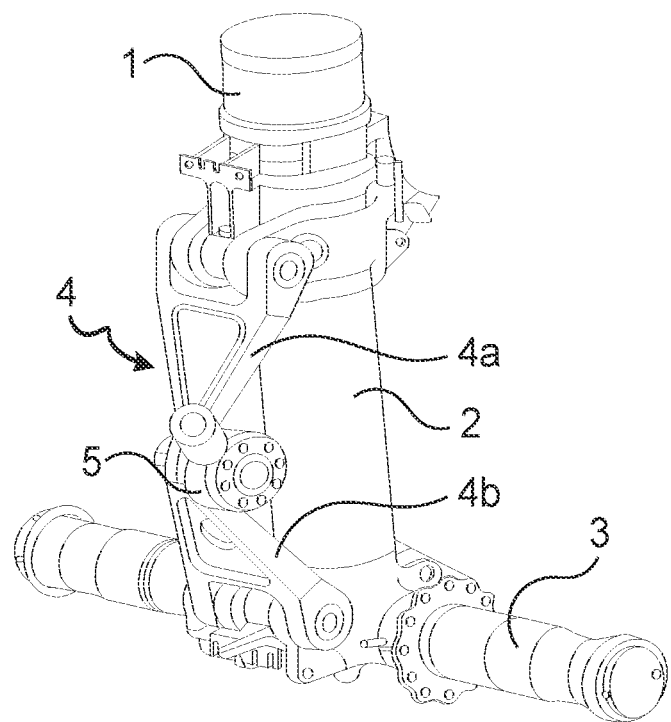
FIG. 1 is a perspective view of an undercarriage having a prior art shimmy-attenuator device.

The invention relates to an undercarriage as shown in FIG. 1 comprising a strut-leg 1 connected to the structure of the aircraft and slidably receiving a sliding rod 2 having its bottom end provided with an axle 3 for receiving wheels (not shown). The undercarriage has a scissors linkage 4 comprising a top branch 4a hinged to the strut-leg 1 and a bottom branch 4b hinged to the sliding rod 2, the two branches 4a and 4b being hinged to each other at an apex of the linkage by means of a pivot pin (not shown in this figure). The linkage 4 allows the rod 2 to slide in the strut-leg 1, while preventing the rod 2 from turning in the strut-leg 1. In known manner, a shimmy-attenuator device 5 is arranged at one end of the ends of the pivot pin to exert both a return force with a threshold, and also a damping force in the event of the branches of the scissors linkage moving axially along the pivot pin as a result of twisting torque tending to turn the sliding rod 2 in the strut-leg 1.

Figure 2:
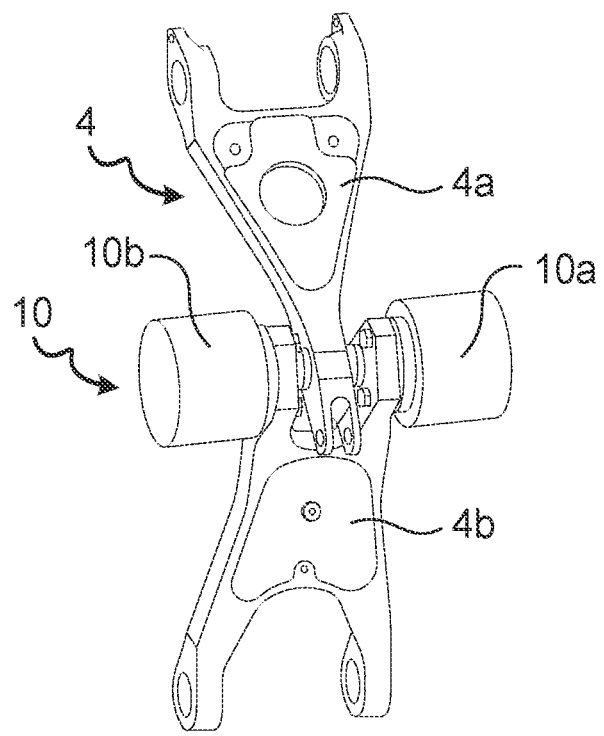
FIG. 2 is a fragmentary perspective view of the scissors linkage of the FIG. 1 undercarriage fitted with a shimmy-attenuator device in a first particular embodiment of the invention.

As shown in FIG. 2, the invention consists in providing a shimmy-attenuator device 10 made up of two modules 10a and 10b arranged on either side of the scissors linkage at its apex. Masses are thus distributed in much more balanced manner, thereby significantly reducing the unbalance effect of the prior art arrangement of FIG. 1. In this example, the device is applied to a scissors linkage having one of its branches 4b terminating in a fork and receiving the other branch 4a in the center of the fork. The shimmy-attenuator device 10 also serves to center the branch 4a in the branch 4b while leaving a gap e on either side. The shimmy-attenuator device urges the branches into this rest position.

Figure 3:
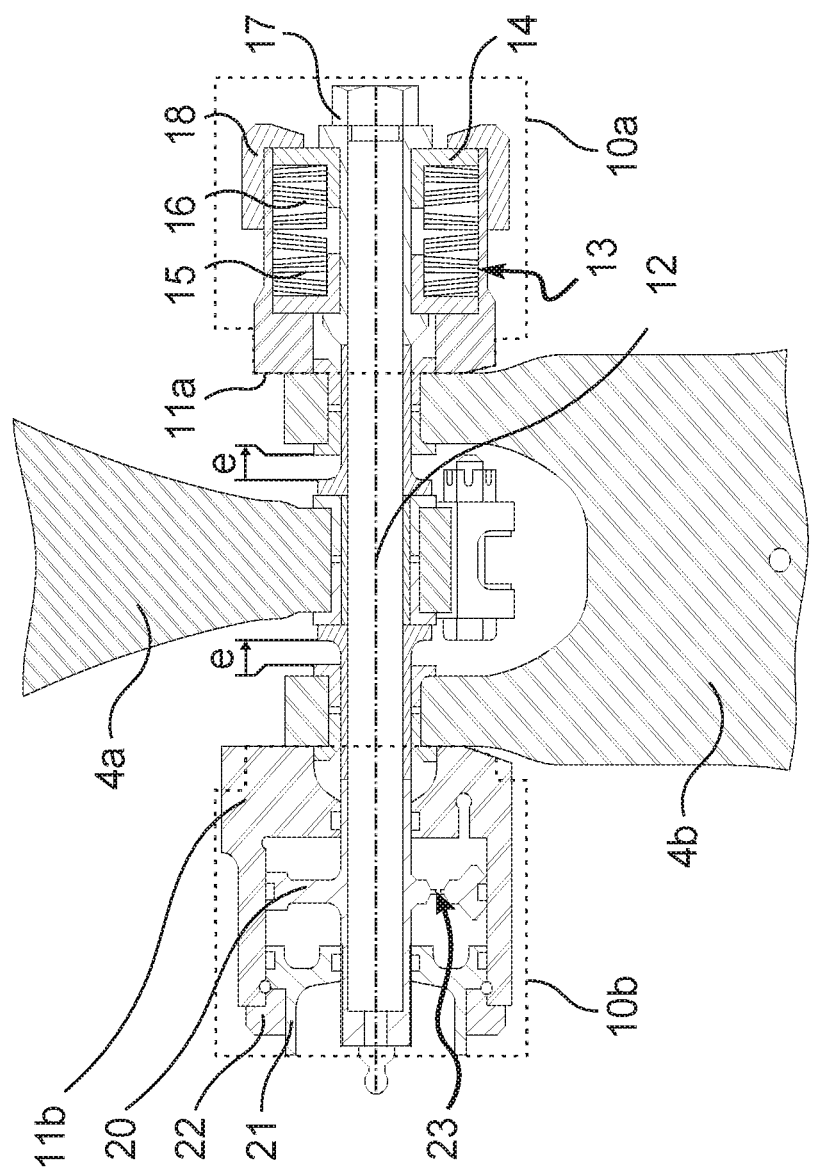
FIG. 3 is a section view of FIG. 2 on a plane containing the geometrical axis of the pivot pin.

More precisely, and as shown in FIG. 3, each of the modules 10a and 10b comprises a hollow body 11a, 11b, each bearing against one of the outside faces of the scissors linkage 4a, 4b and having the pivot pin 12 passing therethrough.

The module 10a is a module exerting a resilient return force. For this purpose, the end of the pivot pin 12 holds captive a cage 13 made up in this example of two bushings 14 having two stacks of Belleville washers 15, 16 mounted in opposite directions therein. The bushings 14 of the cage 13 are held captive on the pivot pin 12 between an abutment of the pivot pin and a terminal nut 17 enabling the washers 15, 16 to be prestressed. Furthermore, the bushings 14 are held captive between an end wall of the body 11a and a nut 18 fitted on the body 11a. Thus, movement of the pivot pin 12 relative to the body 11a is possible only if the force generating the movement exceeds a threshold force determined by the prestress of the Belleville washers 15, 16, and it takes place against a return force directed towards the centered position shown in FIG. 3.

The module 10b is a module exerting a damping force, which is of a hydraulic nature in this example. The pivot pin 12 is secured to a piston 20 that slides in leaktight manner against the inside wall of the body 11b in order to define two chambers therein that are filled with hydraulic fluid. The body 11b is closed by a fitted end wall 21 held on the body by a nut 22. The piston 20 includes a throttling orifice 23 putting the two chambers into fluid-flow communication. Thus, movement of the pivot pin 12 relative to the body 11b takes place against a force generated by throttling the fluid passing from one chamber to the other, thereby giving rise to hydraulic damping.

The pivot pin 12 is clamped onto the branch 4a so as to be axially stationary relative to that branch. The branch 4b is free to move along the pivot pin 12 against the return and damping forces exerted respectively by the module 10a and by the module 10b and generated by movement of the pivot pin 12 relative to the bodies 11a and 11b.

Figure 4:
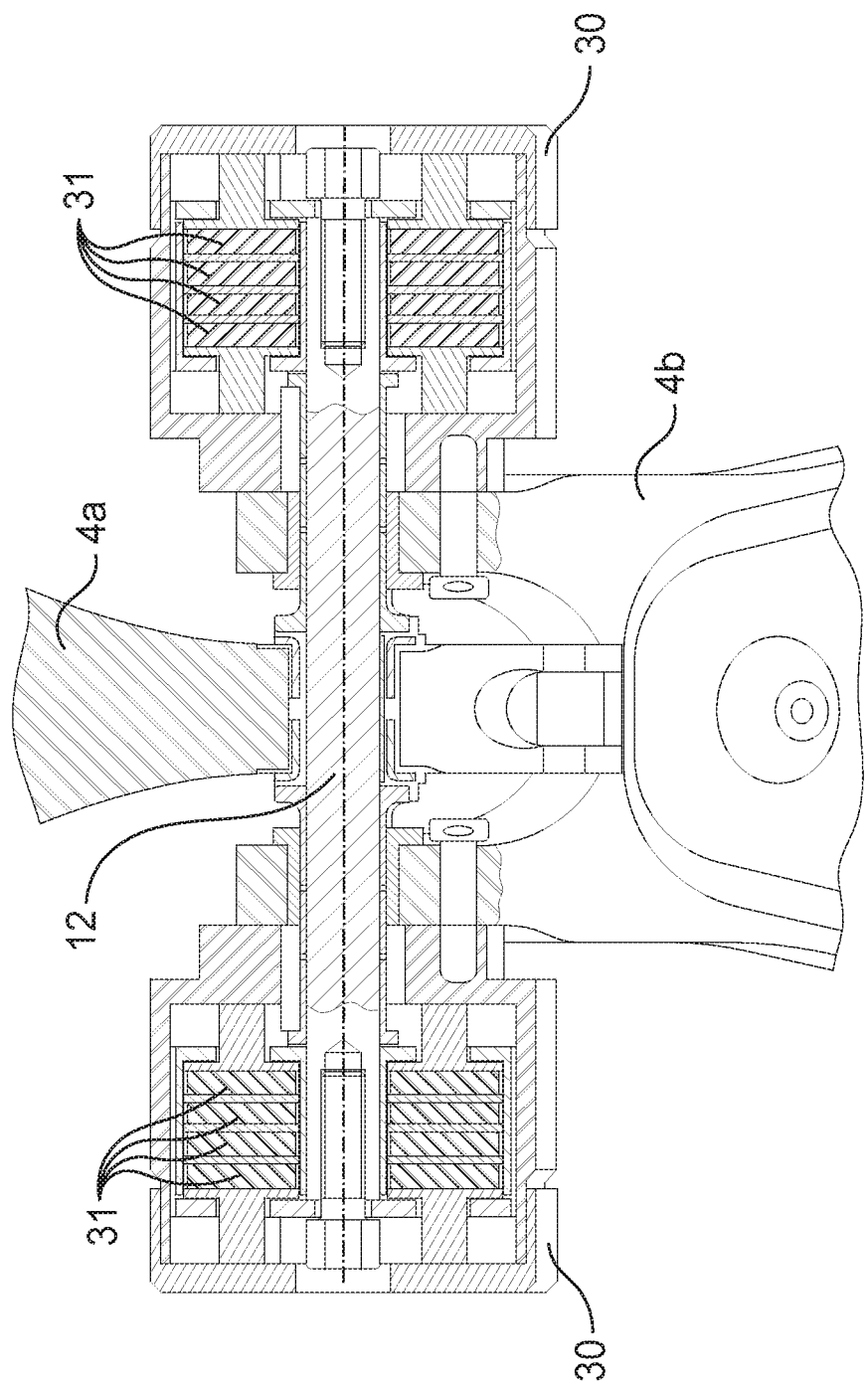
FIG. 4 is a section view analogous to the view of FIG. 3 showing a shimmy-attenuator device in a second particular embodiment of the invention.

In a second particular embodiment as shown in FIG. 4, the two modules 30 are identical and thus each of them performs both the threshold resilient return function and also the damping function. Their structure is identical to the module 10a of the above embodiment, except that the stacks of Belleville washers 15, 16 in this embodiment are replaced by laminated cartridges 31, each made up of a stack of metal washers and of washers made of elastomer material, thereby performing both the threshold resilient return function and also the damping function by virtue of their viscoelastic properties. As above, the cartridges 31 are included in cages that are held captive by the pivot pin 12 and that hold the washers under prestress.

The invention is not limited to the above description, but covers any variant coming within the ambit defined by the claims.

In particular, although the invention is described herein as applied to an undercarriage that does not have steering control, the invention applies equally well to undercarriages that are provided with steering control, in which the top branch of the scissors linkage is hinged not to the strut-leg itself, but rather to an element that is mounted to turn relative to the strut-leg and that occupies an angular position that is adjusted by the steering control.

Although in the first embodiment, the module that provides the threshold resilient return function comprises stacks of Belleville washers, it would naturally be possible to use any other resilient means, such as helical springs, spring blades, . . . .

Although in the second embodiment the modules are fitted with cartridges made up of stacks of metal washers and of elastomer washers, it is possible more generally to use elastomer-based devices that are not necessarily in the form of a stack of washers, but that perform the threshold resilient return function and the damping function as a result of their viscoelastic properties, like the cartridges.

The invention claimed is:

1. An aircraft undercarriage comprising:
   a sliding rod slidably mounted in a strut-leg,
   a scissors linkage having one branch hinged to the strut-leg or to a turning element of a control for steering the sliding rod mounted to turn in the strut-leg, and one branch hinged to the sliding rod, the branches being hinged to each other by a pivot pin, and
   a shimmy-attenuator device placed on the pivot pin of the scissors linkage,
   wherein the shimmy-attenuator device includes threshold resilient return means generating a force returning the branches towards a rest position, and at least damping means generating a damping force when the branches move axially along the pivot pin, and
   wherein the attenuator device comprises two modules placed on either side of the scissors linkage and arranged directly at opposite ends of the pivot pin, each of the modules performing at least one of the damping function and the threshold resilient return function.

2. An undercarriage according to claim 1, wherein one of the modules performs the threshold resilient return function and the other module performs the damping function.

3. The undercarriage according to claim 2, wherein the module that performs the threshold resilient return function comprises a cage containing two series of Belleville washers mounted in opposition and held captive on the pivot pin by means of a terminal nut serving to prestress the washers.

4. The undercarriage according to claim 2, wherein the module that performs the damping function comprises a piston secured to the pivot pin and defining two chambers filled with hydraulic fluid and put into fluid flow communication via a throttling orifice.

5. The undercarriage according to claim 1, wherein the two modules are identical and both perform the threshold resilient return function and the damping function.

6. The undercarriage according to claim 5, wherein each of the modules includes a cage fitted with prestress elastomer washers having viscoelastic properties that perform both the threshold resilient return function and also the damping function.

* * * * *